3,037,907
PESTICIDAL AND FUNGICIDAL COMPOSITION OF MATTER

Edward D. Weil, Lewiston, N.Y., assignor to Hooker Chemical Corporation, Niagara Falls, N.Y., a corporation of New York
No Drawing. Filed Jan. 17, 1961, Ser. No. 83,148
4 Claims. (Cl. 167—30)

This invention concerns a new and valuable sulfur-containing organic compound which lends itself for use as a biocidal product, organic intermediate or polymerizable monomer.

More specifically, this invention comprises a composition of matter consisting of vinyl 1,2,3,4,7,7-hexachlorobicyclo(2.2.1)-hept-2-ene-5-yl sulfone (hereinafter called vinyl hexachlorobicycloheptenyl sulfone), which is a potent fungicide, bactericide and nematocide at low levels of application, which may be employed for disease control in commercial crops, both vegetable or ornamental. The formula of the subject compound is as follows:

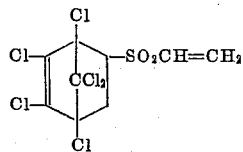

While there is no dearth of fungicides, bactericides or nematocides or intermediates, few compounds have the advantage of possessing all of these qualities, thus allowing a single compound to be used in many different compositions for a variety of uses.

An additional advantage of this inventive composition is that unlike many of the commercially available nematocides, fungicides and bacteriocides, the compound of this invention functions for all of these purposes at low rates of administration. A further advantage is the surprisingly low phytotoxicity of the compound of the invention, which permits its application to the foliage of a wide variety of crops, including those extremely sensitive to damage by chemicals.

Still another valuable characteristic of this compound is that it readily may be compounded for agricultural use in a great variety of formulations each possessing a particular advantage for a particular use. For instance, the active fungicidal and nematocidal compound is a crystalline solid, that being non-hygroscopic by its nature, may readily be granulated or ground to a fine powder which can be conveniently spread either by hand or by a fertilizer spreader or a seed planter without caking up or clogging the mechanical spreading device. In the alternative the pesticidal solid may be pelletized and used as such or admixed with the soil using a plow or disc or spade. If it is required, the pesticidal component may be diluted with a solid diluent such as clay, vermiculite, silica, solid fertilizer, saw dust or the like. An additional advantage of the inventive compound is that it is stable and soluble in a great variety of common, inexpensive, organic solvents such as xylene or toluene or petroleum fractions. These solutions may be used to produce emulsions with water using the usual wetting, surface active, suspending, sequestering and emulsifying agents. When the pesticide or fungicide is formulated as an emulsion, it may be watered into the soil or may be applied immediately before a rainfall.

The subject compound having a reactive vinyl group may be incorporated into commercially useful resins, and may also be reacted with compounds and polymers having —OH, —NH, —SH and PH groups.

Similarly, because of the reactive vinyl grouping of the molecule, the inventive compounds have utility as organic intermediates for the preparation of derivatives, many of which are pesticidal.

The compound of this invention in the technical state, is a low-melting, colorless solid, the recrystallized material is a crystalline solid, melting between ninety-four and ninety-six degrees centigrade. It may be prepared, among other ways, by the Diels-Alder reaction of an excess of divinyl sulfone with hexachlorocyclopentadiene. The use of no less than one mole of divinyl sulfone per mole of hexachlorocyclopentadiene is preferred since it avoids the formation of substantial amounts of the di-adduct, bis-(hexachlorobicycloheptenyl) sulfone, as a by-product. A convenient preparation is to heat the two reactants together at fifty to two hundred and fifty degrees centigrade for a period ranging from one hour to several days, preferably at about one hundred and twenty to one hundred and eighty degrees centigrade. At lower temperatures (below one hundred degrees centigrade), the reaction is inconveniently slow, and at higher temperatures resinous by-products predominate. Solvents such as petroleum hydrocarbons may be used. While atmospheric pressures are commonly used where the equipment is available and it is convenient, sub or super-atmospheric temperature may be used without detriment. Polymerization inhibitors such as phenols, quinones, and the like may be added to reduce the tendency towards polymerization. A more detailed description of the synthesis of the inventive compound, as well as its formulation and use, are described in the examples which follow.

EXAMPLE 1

A mixture of one hundred parts of divinyl sulfone and fifty parts of hexachlorocyclopentadiene were heated for twenty-four hours at one hundred and fifty degrees centigrade. The mixture was then fractionally distilled to remove unreacted starting materials, until a pot temperature of one hundred and forty-three to one hundred and fifty-six degrees centigrade at 0.1 millimeter was reached. The residual syrup was then warmed and stirred with heptane until no further material appeared to go into solution, then the heptane solution was decanted from the insolubles and chilled. The precipitated solid thus obtained had the correct elemental analysis for vinyl hexachlorobicycloheptenyl sulfone. It could be crystallized from heptane to obtain crystals melting at ninety-four to ninety-six degrees centigrade. A second crop of crystals having a lower melting point could be obtained by concentrating the mother liquor.

*Analysis.*—Calcd. for $C_9H_6O_2SCl_6$: Cl, 54.5. Found: Cl, 54.2.

EXAMPLE 2

*Reaction of $C_5Cl_6$ With Divinyl Sulfone Giving Diadduct*

In a similar experiment employing one hundred and fifty parts of hexachlorocyclopentadiene and twenty-five parts of divinyl sulfone heated for two hours at one hundred and forty to one hundred and seventy degrees centigrade the principal product isolated was fifty parts of a heptane-insoluble solid, which when recrystallized from benzene had a melting point of 239.5 to two hundred and forty degrees centigrade. This was shown to be the di-adduct by analysis.

*Analysis.*—Calcd. for $C_{14}H_6O_2Cl_{12}S$: Cl, 64.1. Found Cl, 63.7.

EXAMPLE 3

*Formulation of Vinyl Hexachlorobicycloheptenyl Sulfone as an Emulsion*

The following were weighed out:

| | Parts |
|---|---|
| Vinyl hexachlorobicycloheptenyl sulfone | 10 |
| Xylene | 15 |
| Polyoxyethylene sorbitan laurate (emulsifier) | 5 |

These ingredients were blended to make a solution emulsifiable with water.

EXAMPLE 4

*Formulation as a Dust*

One part of vinyl hexachlorobicycloheptenyl sulfone was ground with nine parts of Microcel E (a synthetic clay), to prepare a pesticidal dust.

EXAMPLE 5

*Formulation as a Wettable Powder*

Three parts of vinyl hexachlorobicycloheptenyl sulfone was ground with 0.9 space part of Microcel E, 0.08 part of Marasperse N (a lignin sulfonate dispersing agent), and 0.02 part of Sorbit P (a wetting agent) to prepare a wettable powder.

EXAMPLE 6

*Use as a Fungicide*

A suspension of the compound of Example 1 was made by grinding it with Microcel E, etc., as in Example 5, and dispersing this powder in water. It was sprayed at various concentrations on tomato plants inoculated with spores of *Alternaria solani* (early blight disease). When untreated controls had developed severe symptoms of the disease, the percent control of the disease (judged by the percent reduction of the number of foliar lesions relative to the controls) was estimated. The data is given in the following table.

| Concentration (p.p.m.): | Control |
|---|---|
| 100 | 100 |
| 50 | 97 |
| 25 | 97 |
| 125 | 72 |

EXAMPLE 7

In another series of tests on control of late blight of tomatoes (*Phytophthora infestans*), ninety-eight percent control was obtained at one hundred parts per million, as compared to ninety percent control with an equal concentration of N-(trichloromethylthio) phthalimide, a commercial fungicide.

EXAMPLE 8

Tests were run on the inhibition of germination of *Sclerotium rolfsii* (southern blight), by applying the chemical at various concentrations (in water dispersion), to black blotting paper, applying sclerotia to the treated paper, and incubating in closed vials. Substantially complet inhibition of germination was observed with the chemical of the invention at concentrations as low as fifty parts per million.

EXAMPLE 9

Soil infested with *Meloidogyne incognita* var. *acrita*, the nematode causative of root knot disease, was admixed with the compound of the invention at 0.5 gram per gallon of soil. Cucumber seedlings transplanted into this treated soil developed only trace symptoms of root knot disease, whereas cucumber seedlings transplanted into similarly infested but untreated soil developed severe root damage caused by nematode galls.

EXAMPLE 10

In nutrient agar, the compound of the invention at two hundred and fifty-five parts per million gave marked repression of the growth of *Staphylococcus aureus* (a common bacterium).

I claim:

1. Vinyl 1,2,3,4,7,7-hexachlorobicyclo(2.2.1)hept-2-en-5-yl sulfone.
2. A pesticidal composition consisting of vinyl 1,2,3,4,7,7-hexachlorobicyclo(2.2.1)hept-2-en-5-yl sulfone plus a carrier.
3. The composition of claim 2 wherein the inactive component of the composition is a solid carrier.
4. The composition of claim 2 wherein the inactive component of the composition is a solvent.

References Cited in the file of this patent

UNITED STATES PATENTS 2,676,130    Winterstein _____ Apr. 20, 1954